United States Patent
Ngo et al.

(10) Patent No.: US 11,681,831 B2
(45) Date of Patent: Jun. 20, 2023

(54) THREAT DETECTION USING HARDWARE PHYSICAL PROPERTIES AND OPERATING SYSTEM METRICS WITH AI DATA MINING

(71) Applicant: International Business Machines Corporation, Armonk, NY (US)

(72) Inventors: HuyAnh D. Ngo, Sterling Heights, MI (US); Juan A. Martinez Castellanos, Doral, FL (US); Srinivas B. Tummalapenta, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 16/380,970

(22) Filed: Apr. 10, 2019

(65) Prior Publication Data
US 2020/0327255 A1 Oct. 15, 2020

(51) Int. Cl.
G06F 21/75 (2013.01)
G06F 1/28 (2006.01)
G06N 20/00 (2019.01)
G06F 21/55 (2013.01)
G06F 21/57 (2013.01)

(52) U.S. Cl.
CPC ............ *G06F 21/75* (2013.01); *G06F 1/28* (2013.01); *G06F 21/554* (2013.01); *G06F 21/577* (2013.01); *G06N 20/00* (2019.01)

(58) Field of Classification Search
CPC .......... G06F 21/75; G06F 1/28; G06F 21/554; G06F 21/577; G06N 20/00
See application file for complete search history.

(56) References Cited

U.S. PATENT DOCUMENTS

| 8,806,629 | B1 | 8/2014 | Cherepov et al. |
| 9,729,562 | B2 | 8/2017 | Sonnenberg et al. |
| 9,942,250 | B2 | 4/2018 | Stiansen et al. |
| 10,907,940 | B1 * | 2/2021 | Parker ................ G06N 20/00 |
| 2015/0373038 | A1 | 12/2015 | Blackwell |
| 2016/0337390 | A1 * | 11/2016 | Sridhara ............ H04W 12/128 |

(Continued)

FOREIGN PATENT DOCUMENTS

WO 2017210770 12/2017

OTHER PUBLICATIONS

Ahuja et al., "The Use of Artificial Intelligence Based Techniques for Intrusion Detection: A Review," Artif Intell Rev, Springer Science+Business Media B.V., Sep. 2010, 20 pages.

(Continued)

*Primary Examiner* — Trang T Doan
*Assistant Examiner* — Vladimir I Gavrilenko
(74) *Attorney, Agent, or Firm* — Van Leeuwen & Van Leeuwen; Jeffrey S. LaBaw (57) ABSTRACT

An approach is provided that receives a set of actual hardware power consumption details and a set of software activity details with all of the details pertaining to the use of a computer system at a first time. Based on the set of software activity details, the approach determines a set of expected hardware power consumption details. The set of actual hardware power consumption details are compared to the set of expected hardware power consumption details. If the comparison identifies variances between the actual and expected data, then a security threat is flagged and threat responses are performed.

9 Claims, 8 Drawing Sheets

(56) References Cited

U.S. PATENT DOCUMENTS

| | | | |
|---|---|---|---|
| 2017/0046510 A1* | 2/2017 | Chen .................... | G06F 21/552 |
| 2017/0063890 A1 | 3/2017 | Muddu et al. | |
| 2017/0279833 A1* | 9/2017 | Vasseur ................. | H04L 45/08 |
| 2018/0007074 A1* | 1/2018 | Kune ..................... | H04L 41/06 |
| 2019/0020663 A1* | 1/2019 | Bartos ................... | G06N 20/00 |
| 2019/0260782 A1* | 8/2019 | Humphrey ............. | G06N 20/10 |

OTHER PUBLICATIONS

Ozsoy et al., "Hardware-Based Malware Detection using Low-level Architectural Features," IEEE Transactions on Computers, vol. 65, Issue: 11, Nov. 2016, 14 pajges.

George et al., "Proactive Threat Detection, Tracking and Warning System Through Wi-Fi Advanced Wide Access Controller," ip.com, IPCOM000247887D, Oct. 10, 2016, 17 pages.

Anonymous, Machine Learning for Hardware Simulation, ip.com, IPCOM000251992D, Dec. 13, 2017, 33 pages.

Anonymous, "Predictive Cryptocurrency Mining and Staking," ip.com, IPCOM000252017D, Dec. 13, 2017, 34 pages.

Munia et al., "Network Intrusion Detection Using Selected Data Mining Approaches: a Review," International Journal of Computer Applications (0975-8887), vol. 132—No. 13, Dec. 2015, 8 pages.

Tang et al., "Unsupervised Anomaly-based Malware Detection using Hardware Features," International Workshop on Recent Advances in Intrusion Detection (RAID), 2014, Gothenburg, Sweden, Sep. 2014, 21 pages.

\* cited by examiner

THREAT DETECTION USING HARDWARE PHYSICAL PROPERTIES AND OPERATING SYSTEM METRICS WITH AI DATA MINING

BACKGROUND

Security monitoring involves the monitoring and detection of security events on a computer or computer network, and the execution of appropriate responses to such detected events. One purpose of security monitoring is the development of well understood and predictable responses to damaging events and computer intrusions with such responses often designed to minimize or prevent damage to the computer or computer network. Computer security monitoring is an administrative function of managing and protecting computer assets, networks and information systems. These systems continue to become more critical to the personal and economic welfare of our society. Responsible organizations (e.g., public and private sector groups, associations and enterprises, etc.) strive to understand the respective organization's responsibilities to the public good and to the welfare of their members and stakeholders. Generally, however, a shortcoming of security monitoring and threat detection is that it is solely based on data gathered from multiple different software components. In reality, however, there are concerns with the possibility that there exists a group of threats that manage to completely circumvent all of the software-based security systems.

SUMMARY

An approach is provided that receives a set of actual hardware power consumption details and a set of software activity details with all of the details pertaining to the use of a computer system at a first time. Based on the set of software activity details, the approach determines a set of expected hardware power consumption details. The set of actual hardware power consumption details are compared to the set of expected hardware power consumption details. If the comparison identifies variances between the actual and expected data, then a security threat is flagged and threat responses are performed.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

FIGS. 1-8 describe an approach that uses hardware physical property measurements in combination with data provided from the software to provide insight on threats that may be elusive to traditional security monitoring approaches. When the comparison of the hardware data and the software data provides disagreements, these disagreements can be analyzed to determine if they represent new threats to the computer system. Even if a malicious process does not show up in software scans, the data collected from the hardware provides evidence of extra unaccounted usage of the computer system that can be used to discover the malicious process.

The approach detects new threats in order to improve computer security by creating a platform that uses disagreements between hardware property measurements and data obtained about the state of the processes being carried away by the operating system. On the hardware side, this approach involves the use of an application that collects information from physical measuring instruments that measure the physical state of the processor, such as thermometers, voltmeters, ammeters, and the like. On the software side, the approach gathers software usage information, typically from the operating system, such as what processes are currently running, how much memory is being used, the percentage of the processor usage, etc.

These two groups of information, from the hardware and from the software, are compared. If an incongruence is found between what the operating system shows and what the physical measurements indicate, then such an instance is flagged as a possible threat to the computer system. This threat identification can be buttressed given additional evidence, such as if the number of network I/O packages also increased. For example, if a client computer shows an internet browser as the only open task, but the power consumption is being measured to be substantially higher than usual and the outgoing traffic follows an increasing trend, then this might indicate that there are some undercover (undetected) processes being run by a hacker, perhaps with malicious or harmful intent.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
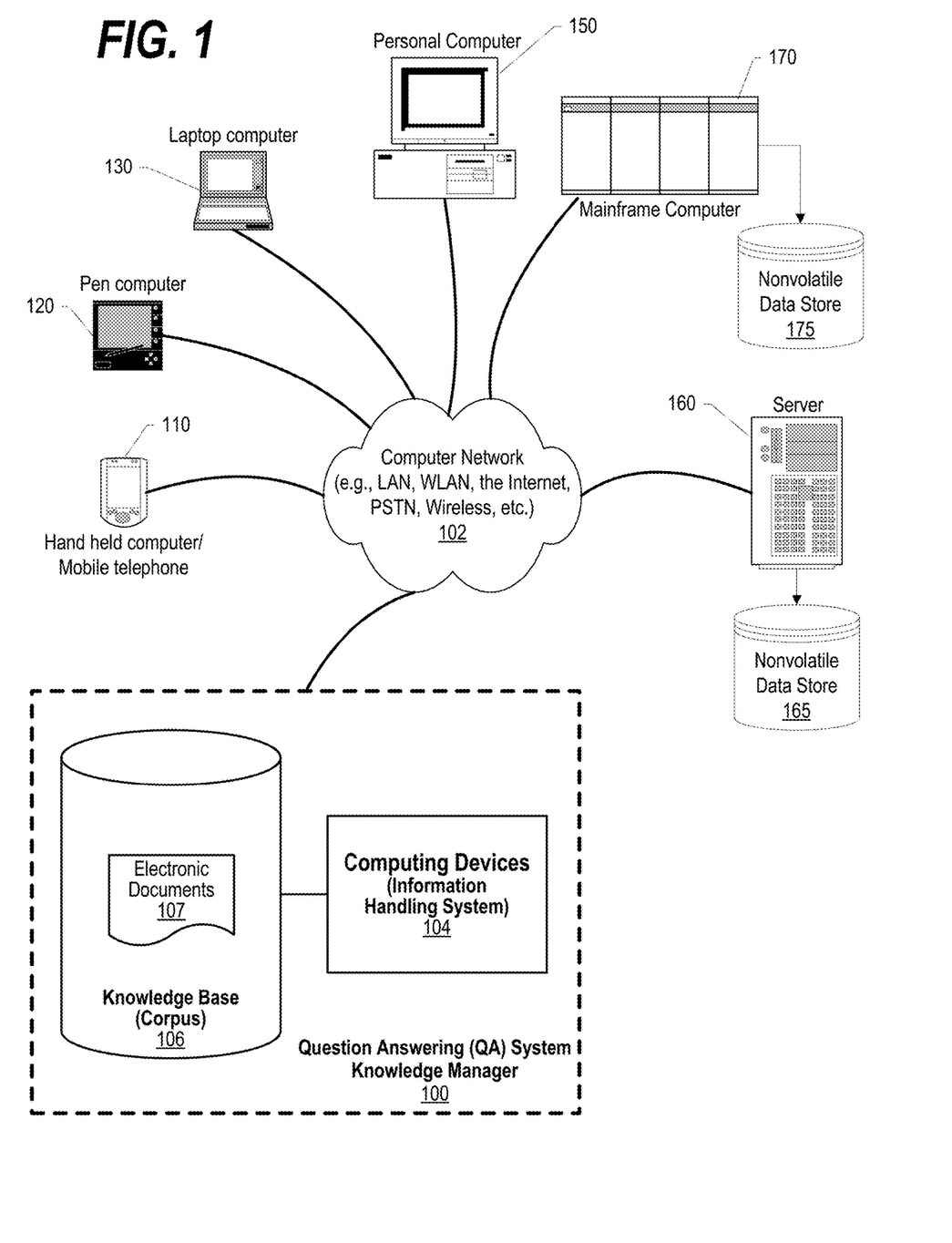
FIG. 1 depicts a network environment that includes a knowledge manager that utilizes a knowledge base.

FIG. 1 depicts a schematic diagram of one illustrative embodiment of a question/answer creation (QA) system 100 in a computer network 102. QA system 100 may include a knowledge manager computing device 104 (comprising one or more processors and one or more memories, and potentially any other computing device elements generally known in the art including buses, storage devices, communication interfaces, and the like) that connects QA system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 107 or other data, a content creator, content users, and other possible sources of input. In one embodiment, some or all of the inputs to QA system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with QA system 100. Electronic documents 107 may include any file, text, article, or source of data for use in QA system 100. Content users may access QA system 100 via a network connection or an Internet connection to the network 102, and may input questions to QA system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. QA system 100 may interpret the question and provide a response to the content user containing one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
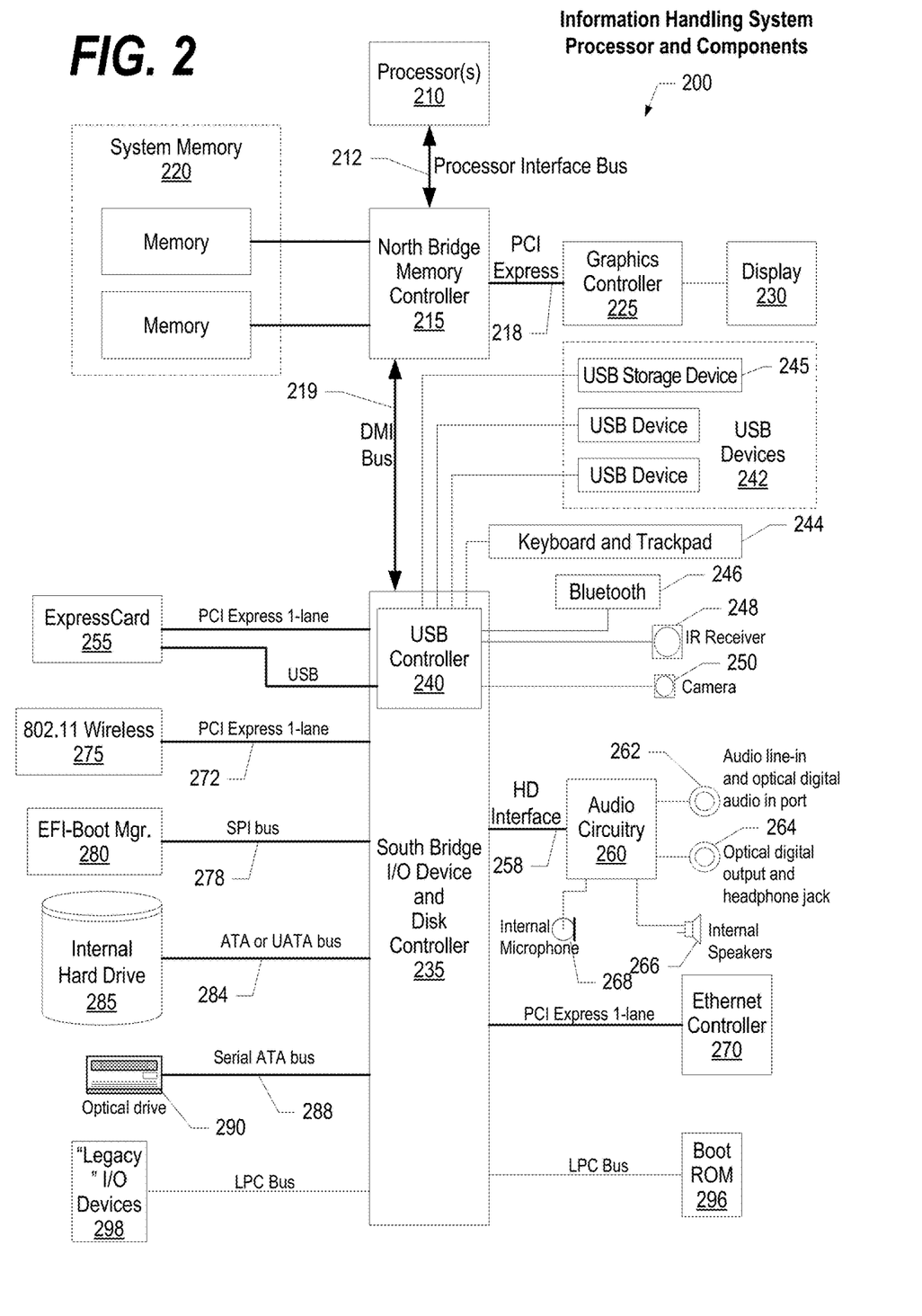
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
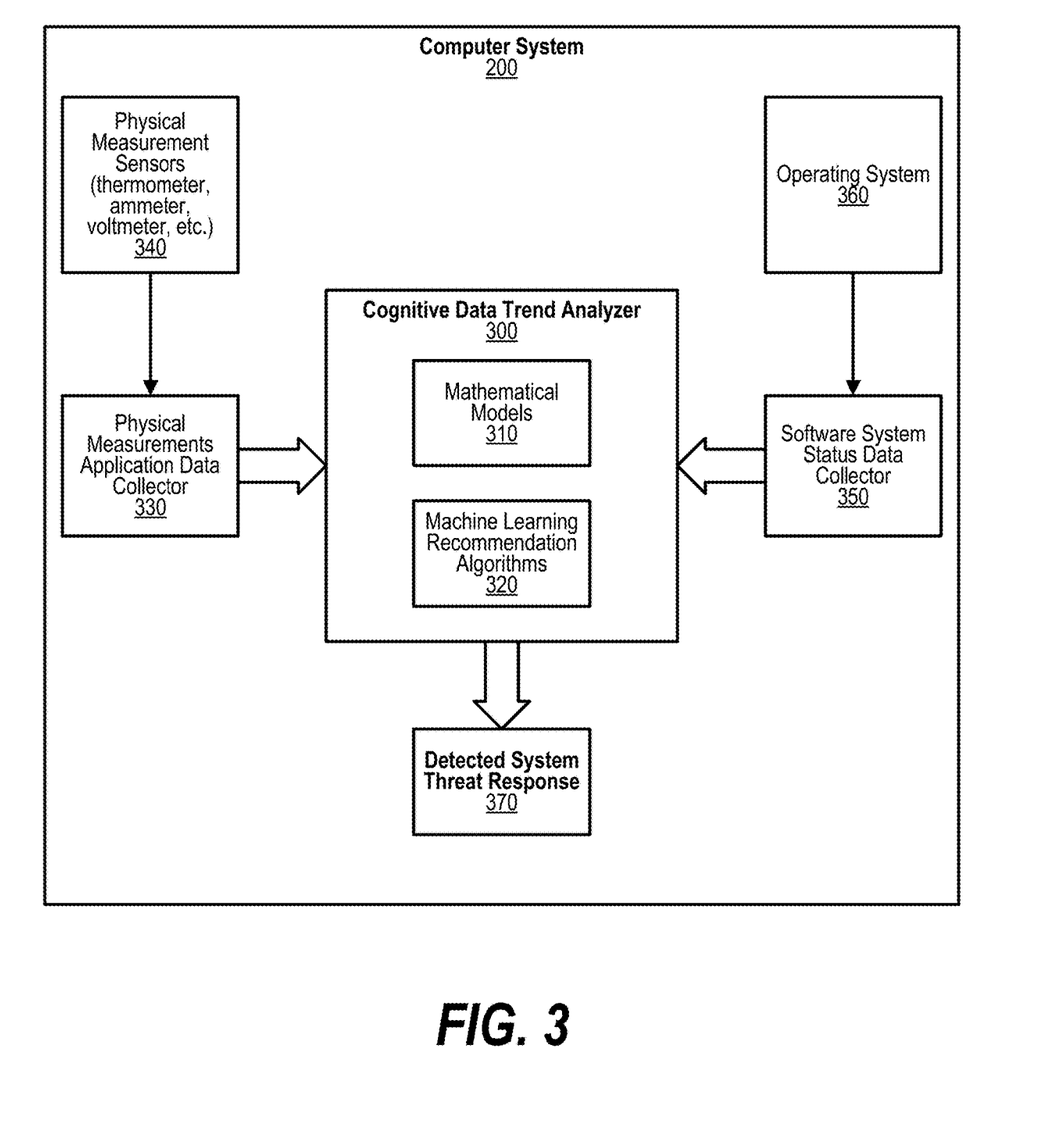
FIG. 3 is a component diagram that shows the various components included in an architecture that provides a cognitive data trend analyzer to detect threats to a computer system.

FIG. 3 is a component diagram that shows the various components included in an architecture that provides a cognitive data trend analyzer to detect threats to a computer system. Computer system 200 is being analyzed for security threats by cognitive data trend analyzer 300. The cognitive data trend analyzer include both mathematical models 310 as well as machine learning (ML) models 320.

Cognitive data trend analyzer 300 receives inputs regarding physical electrical consumption aspects of computer system 200 with these electrical consumption aspects being readings from sensors 340 that sense electrical parameters such as temperature from a thermometer, current from an ammeter, voltage from a voltmeter, and the like. Process 330 is a physical measurements application data collector and it collects the inputs regarding the physical electrical consumption aspects of computer system 200 from sensors 340.

Cognitive data trend analyzer 300 also receives inputs regarding the software and processes that are currently running on computer system 200. Process 350 is a software system status data collector that collects current processing details regarding the operating system specifications and the processes currently running on the operating system from operating system 360.

Cognitive data trend analyzer 300 predicts an expected hardware power consumption based upon the software activity details gathered by the software system status data collector. This expected hardware power consumption is compared to the actual hardware power consumption details that was provided by the physical measurements application data collector. If the comparison reveals a variance that is beyond a given threshold, then process 370 is performed in light of a detected system threat response.

Figure 4:
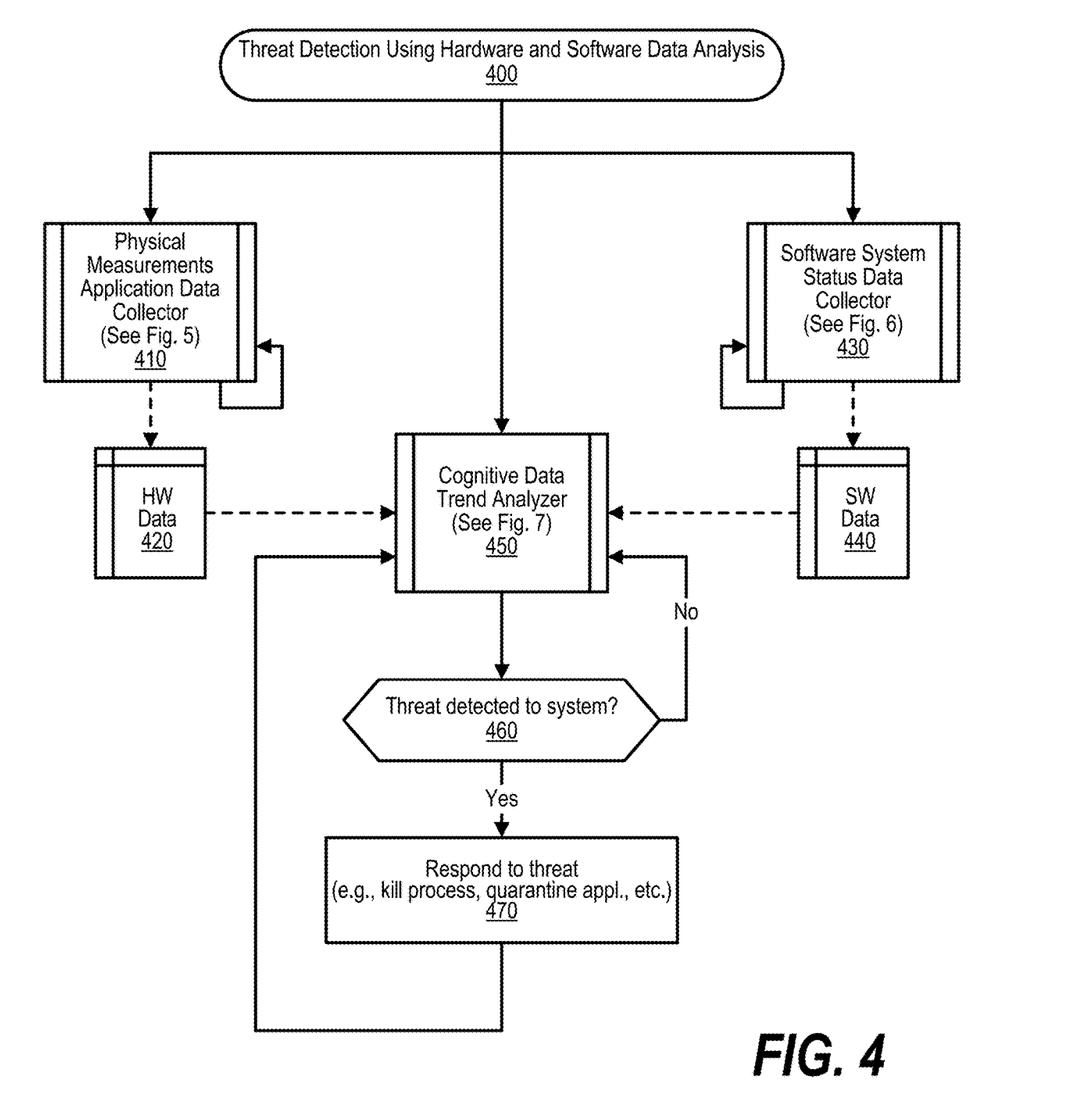
FIG. 4 is a depiction of a flowchart showing the logic used in computer system threat detection using both hardware and software data analysis.

FIG. 4 is a depiction of a flowchart showing the logic used in computer system threat detection using both hardware and software data analysis. FIG. 4 processing commences at 400 and shows the steps taken by a process that detects threats to a computer system using a combined hardware and software data analysis approach.

Figure 5:
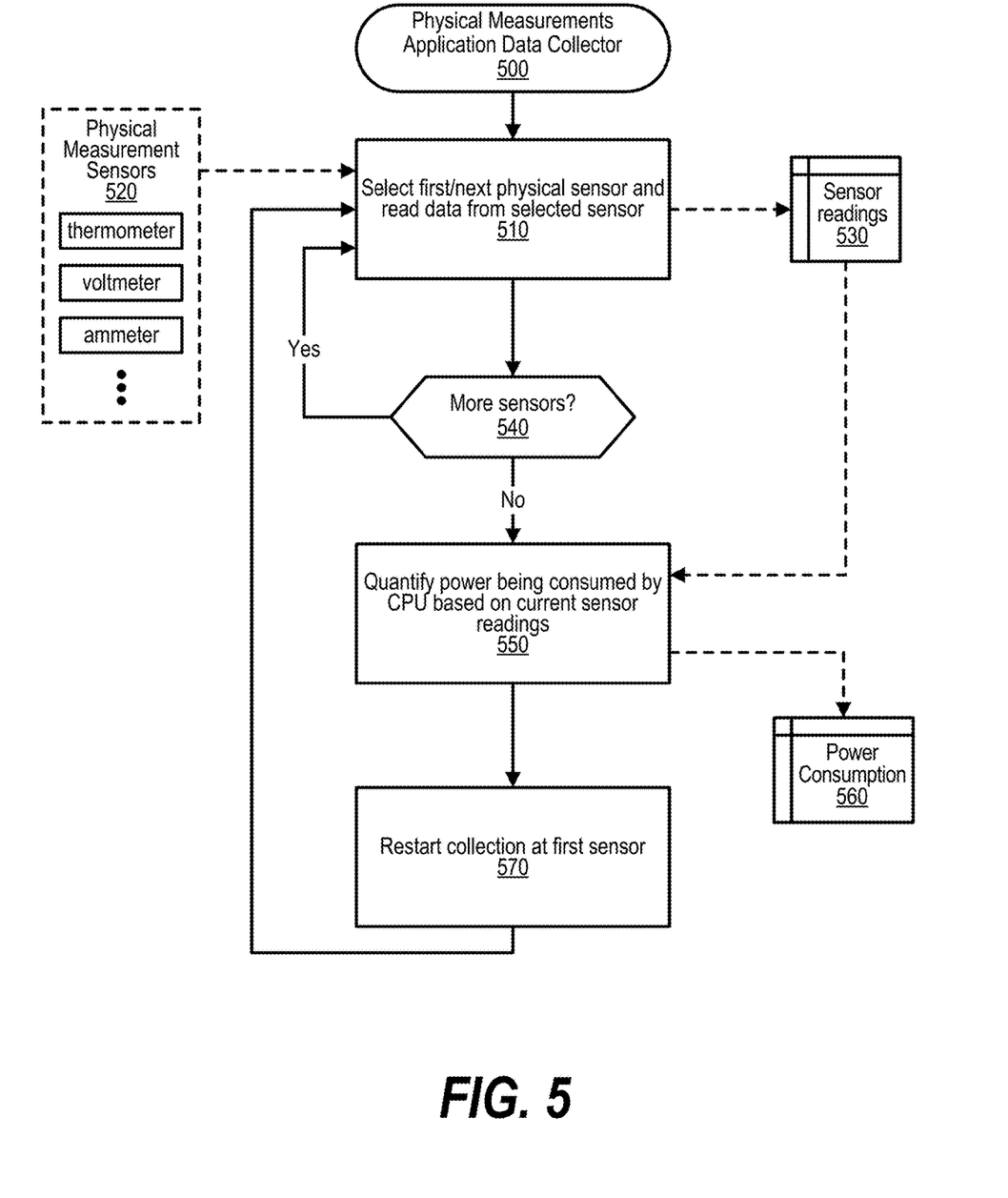
FIG. 5 is a depiction of a flowchart showing the logic used to collect physical measurements by an application data collector.

At predefined process 410, the process performs the Physical Measurements Application Data Collector routine (see FIG. 5 and corresponding text for processing details). Predefined process 410 stores the data collected into memory area 420.

Figure 6:
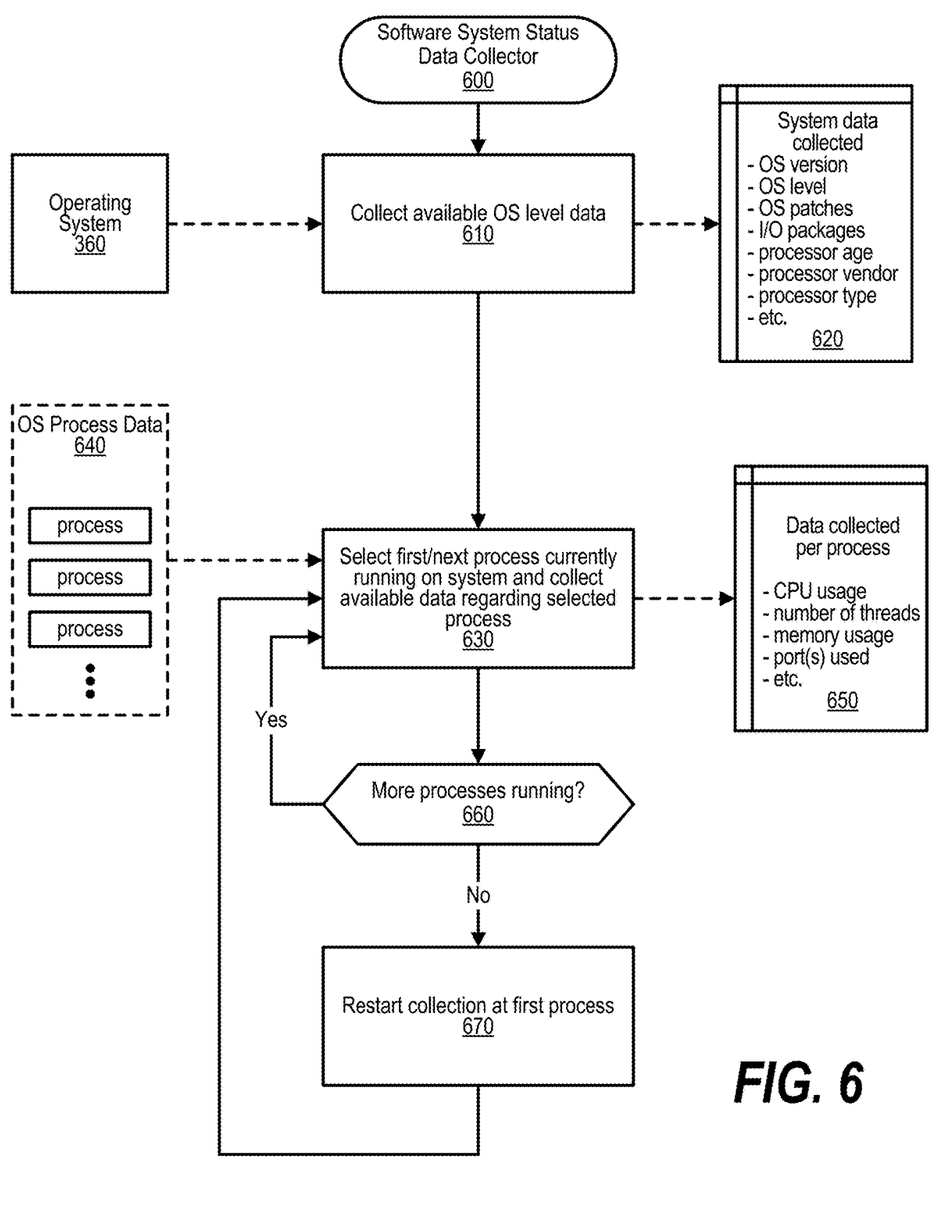
FIG. 6 is a depiction of a flowchart showing the logic used to collect software system status used by the cognitive data trend analyzer.

At predefined process 430, the process performs the Software System Status Data Collector routine (see FIG. 6 and corresponding text for processing details). Predefined process 430 stores the data collected into memory area 440.

Figure 7:
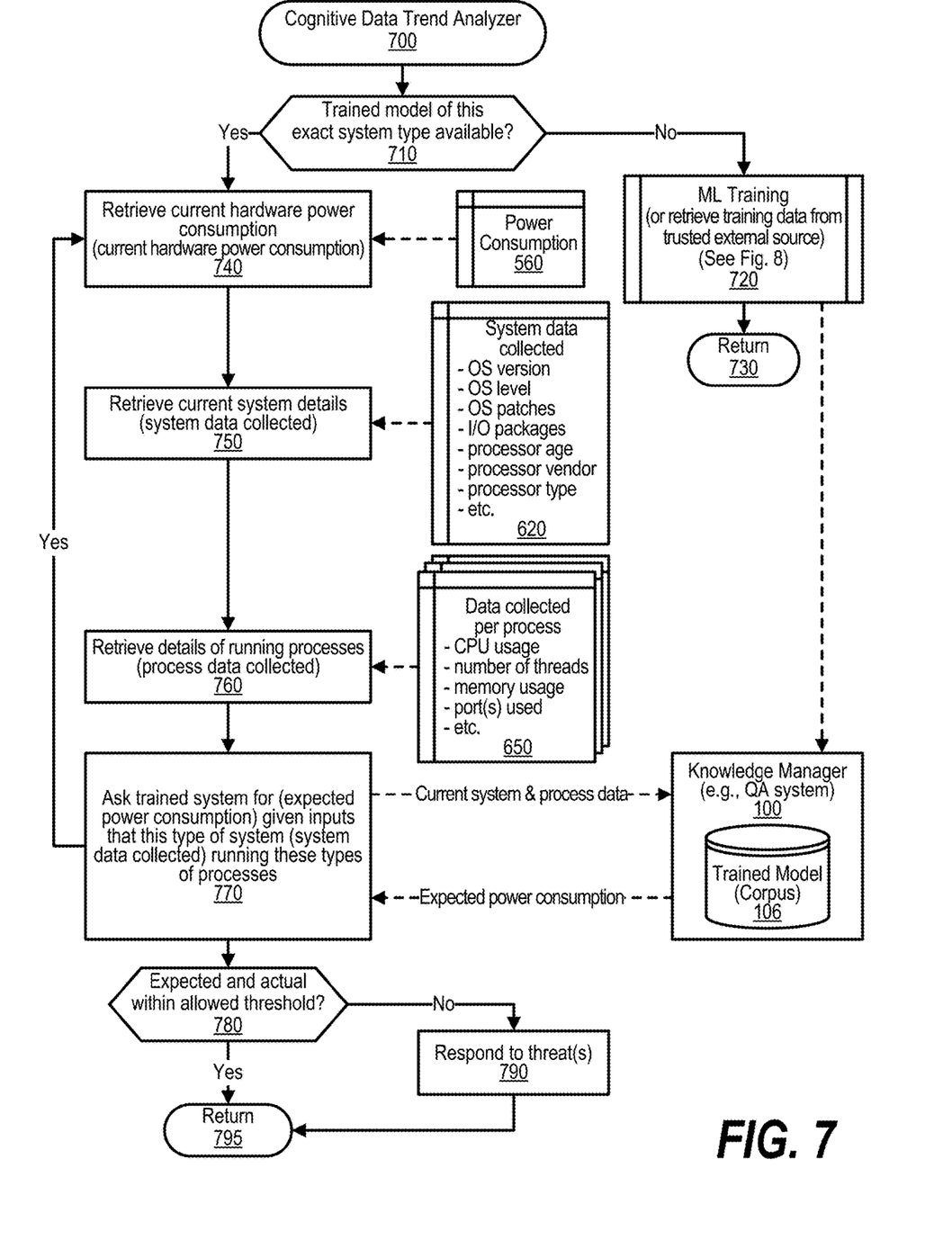
FIG. 7 is a depiction of a flowchart showing the logic used to by the cognitive data trend analyzer to detect threats to a computer system.

At predefined process 450, the process performs the Cognitive Data Trend Analyzer routine (see FIG. 7 and corresponding text for processing details). Predefined process 430 uses, as input, the data that was stored by the other processes in memory areas 420 and 440. Predefined process 450 processes the data in order to determine whether a security threat is currently being posed to the computer system.

The process determines as to whether the cognitive data trend analyzer detected a threat to the computer system (decision 460). If a threat was detected to the computer system, then decision 460 branches to the 'yes' branch whereupon, at step 470, the process responds to the detected threat (e.g., kill process, quarantine appl., report the threat to the user or security personnel, etc.). On the other hand, if a threat was not detected to the computer system, then decision 460 branches to the 'no' branch which loops back to predefined process 450 to continue analyzing hardware and software data to identify possible security threats.

FIG. 5 is a depiction of a flowchart showing the logic used to collect physical measurements by an application data collector. FIG. 5 processing commences at 500 and shows the steps taken by a process that implants the Physical Measurements Application Data Collector process. At step 510, the process selects the first physical sensor and read the data collected by the selected sensor. Sensors 520 are shown including a variety of sensors including a thermometer, a voltmeter, an ammeter, etc. Step 510 stores these sensor readings in memory area 530.

The process determines as to whether there are more sensor readings to gather (decision 540). If there are more sensor readings to gather, then decision 540 branches to the 'yes' branch which loops back to step 510 to select and gather data from the next sensor. This looping continues until all of the sensors have been read, at which point decision 540 branches to the 'no' branch exiting the loop. At step 550, the process quantifies the power being consumed by the computer system based on the sensor readings that were just read. This power consumption quantity is stored in memory area 560. At step 570, the process restarts collection at first sensor. In one embodiment, the process is performed on a predetermined interval basis (e.g., every minute, etc.), in which case the process would wait for the next interval before looping back to step 510 to restart the collection process.

FIG. 6 is a depiction of a flowchart showing the logic used to collect software system status used by the cognitive data trend analyzer. FIG. 6 processing commences at 600 and shows the steps taken by a process that implements the Software System Status Data Collector process. At step 610, the process collects available operating system level data from operating system (OS) 360. The system data collected is stored in memory area 620 and includes data such as the OS version, the OS level, the OS patches applied to the system, the processor age, the processor vendor, the processor type, and the input/output (I/O) packages, etc. The I/O packages are computing traffic at a system network socket level that are generated by that computer system or by a user of the system. Using a house analogy, the front door is the system network socket. The number times that the door is opened and closed would be similar to the number of I/O packages. If the number of I/O packages increase and the current usage of known application stay the same, this situation could be a potential security threat to the system. Similar to the house analogy from above, if the front door keeps being opened and closed without acknowledgement of the house owner, it is a potential threat that someone else is possibly breaking into the house. Likewise, if the number of I/O packages unexplainably increase, this might indicate that a malevolent user (e.g., hacker, etc.) or a process from outside the computer system is using the system for unauthorized uses, such as using the system as a "bot" for malevolent purposes.

At step 630, the process selects the first process currently running on the computer system and collects available data regarding the selected process. Step 630 receives OS process data 640 from the OS and stores the process data collected in memory area 650. The data collected, per process, and stored in memory area 650 includes the process' CPU usage, number of threads running on the process, the memory usage of the process, the port(s) being used by the process, etc. The process determines whether there are more processes running on the computer system from which process data needs to be collected (decision 660). If there are more processes running on the system, then decision 660 branches to the 'yes' branch which loops back to step 630 to select the next process and collect data regarding the process as described above.

This looping continues until all of the processes have been selected, at which point decision 660 branches to the 'no' branch exiting the loop. At step 670, the process restarts collection at first process. In one embodiment, the process is performed on a predetermined interval basis (e.g., every minute, etc.), in which case the process would wait for the next interval before looping back to step 630 to restart the collection process.

FIG. 7 is a depiction of a flowchart showing the logic used to by the cognitive data trend analyzer to detect threats to a computer system. FIG. 7 processing commences at 700 and shows the steps taken by a process that implements the Cognitive Data Trend Analyzer process. The process determines as to whether a trained model of this exact system type is already available (decision 710). If a trained model of this exact system type is not yet available, then decision 710 branches to the 'no' branch whereupon, at predefined process 720, the process performs the machine learning (ML) training process (or the process retrieves training data from trusted external source for computer systems substantially similar to this computer system). See FIG. 8 and corresponding text for processing details of predefined process 720, after which processing returns to the calling routine (see FIG. 4) at 730.

On the other hand, if a trained model of this exact system type is already available, then decision 710 branches to the 'yes' branch to execute steps 740 through 795. When a trained model of this system already exists, then steps 740 through 795 are performed. At step 740, the process retrieves the current hardware power consumption data from memory area 560. At step 750, the process retrieves the current system details data from memory area 620. At step 760, the process retrieves details regarding the processes currently running on the system from memory area 650. At step 770, the process transmits inputs to the trained ML system requesting (expected power consumption) given inputs that this type of system (system data collected) is running these types of processes (process data collected). The inputs are sent to ML system, such as a trained question-answering (QA) system 100 that includes a trained model with a corpus of training data 106. The ML system responds with an expected power consumption that is received at step 770.

The process determines as to whether the expected power consumption details and the actual power consumption details are within allowed thresholds (decision 780). If the expected and actual power consumption details are within allowed thresholds, then decision 780 branches to the 'yes' branch bypassing step 790 as no threat was detected. On the other hand, if the expected and actual power consumption details are not within allowed thresholds, then decision 780 branches to the 'no' branch whereupon, at step 790, the process performs one or more responses to the detected threat (e.g., notifying the user or security personnel of the possible threat, etc.). FIG. 7 processing thereafter returns to the calling routine (see FIG. 4) at 795.

In one embodiment, thresholds are set based on historical analysis of actual versus expected power consumption over a period of time where no threats are introduced to a system, such as having a system in a "walled off" safe state. The historical analysis is used to identify a statistically "normal" variance between actual and expected power consumptions and this variance might be quite different from one hardware configuration to another. Once the statistically normal variance is established (e.g., up to 5% variance acceptable for this type of system, etc.), then this data can be used to set the predetermined threshold for the system in decision 780.

Figure 8:
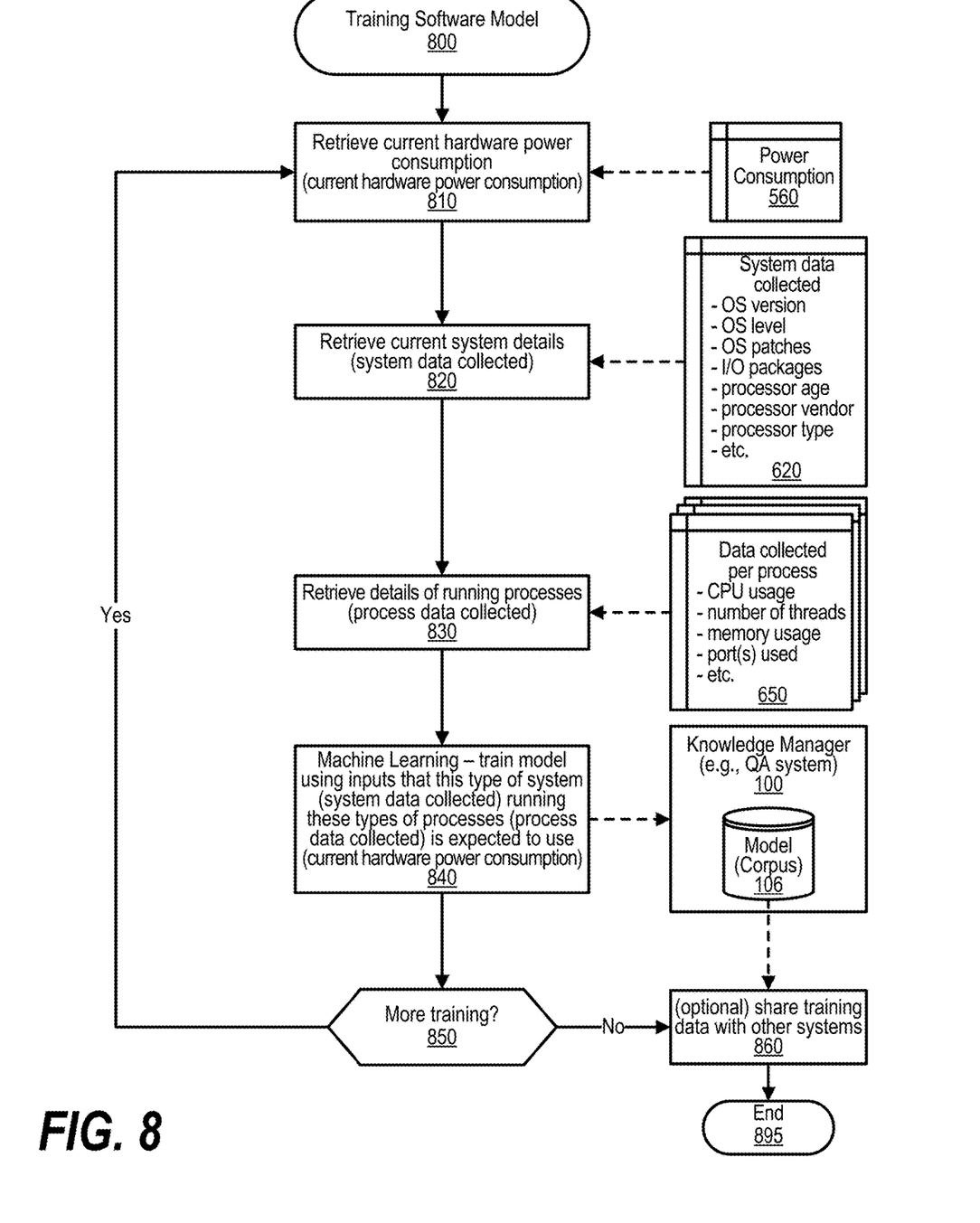
FIG. 8 is a depiction of a flowchart showing the logic to train a software model that is utilized by the cognitive data trend analyzer.

FIG. 8 is a depiction of a flowchart showing the logic to train a software model that is utilized by the cognitive data trend analyzer. FIG. 8 processing commences at 800 and shows the steps taken by a process that trains a machine learning (ML) software model regarding the power consumption of the computer system so that the model can predict an expected power consumption when provided with software details regarding software currently running on the system.

At step 810, the process retrieves the current hardware power consumption details (current hardware power consumption) from memory area 560. At step 820, the process retrieves the current system details (system data collected) from memory area 620. At step 830, the process retrieves details of the processes currently running on the computer system (process data collected) from memory area 650. At step 840, the process performs a machine learning function that trains a model using inputs that this type of system (system data collected) running these types of processes (process data collected) is expected to use (current hardware power consumption). This training data is fed to the ML system, such as QA system 100, where the model training data is retained in corpus 106.

The process determines as to whether more training is needed (decision 850). Typically, numerous iterations of training data are used to train the model. If more training is needed, then decision 850 branches to the 'yes' branch which loops back to step 810 to continue retrieving hardware power consumption and software details and provide further training data to the model. This looping continues until no more training is needed, at which point decision 850 branches to the 'no' branch exiting the loop. At step 860, the process (optionally) shares the training data with other substantially similar computer systems. Model training shown in FIG. 8 thereafter ends at 895.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
    training a machine learning (ML) system to determine expected hardware power consumption, wherein the training is based on a first power consumption, a first set of system data pertaining to a first operating system, and a first set of process data pertaining to one or more first processes;
    receiving a set of actual hardware power consumption details pertaining to the use of a computer system;
    receiving a set of software activity details pertaining to the use of the computer system, wherein the set of software activity details includes a second set of system data pertaining to the operating system of the computer system and a second set of process data pertaining to one or more processes executing on the computer system, wherein the first set of system data and the second set of system data includes an operating system version, an operating system level, and a processor type, and wherein the first set of process data and the second set of process data includes a processor usage, a number of threads, a memory usage, and a set of port usage information;
    determining a set of expected hardware power consumption details based on the set of software activity details, wherein the determining comprises
        inputting, to the trained ML system, the set of software activity details pertaining to the use of the computer system; and
        receiving, from the trained ML system, the set of expected hardware power consumption details based on the set of software activity details;
    comparing the set of actual hardware power consumption details to the set of expected hardware power consumption details; and
    in response to the comparison identifying one or more variances that exceed one or more thresholds, performing one or more threat responses.

2. The method of claim 1 wherein the set of actual hardware power consumption details include at least one reading from the set of details consisting of a temperature reading, a voltage reading, and an electrical current reading, and wherein the set of software activity details further include at least one detail from the set of details consisting of a plurality of process identifications corresponding to the one or more processes executing on the computer system, a CPU usage, a memory usage, and a number of ports used.

3. The method of claim 1 wherein the first set of system data and the second set of system data further includes a set of operating system applied patches, a processor age, and a processor vendor.

4. An information handling system comprising:
    one or more processors;
    a memory coupled to at least one of the processors; and a set of computer program instructions stored in the memory and executed by at least one of the processors in order to perform actions comprising:

training a machine learning (ML) system to determine expected hardware power consumption, wherein the training is based on a first power consumption, a first set of system data pertaining to a first operating system, and a first set of process data pertaining to one or more first processes;

receiving a set of actual hardware power consumption details pertaining to the use of a computer system;

receiving a set of software activity details pertaining to the use of the computer system, wherein the set of software activity details includes a second set of system data pertaining to the operating system of the computer system and a second set of process data pertaining to one or more processes executing on the computer system, wherein the first set of system data and the second set of system data includes an operating system version, an operating system level, and a processor type, and wherein the first set of process data and the second set of process data includes a processor usage, a number of threads, a memory usage, and a set of port usage information;

determining a set of expected hardware power consumption details based on the set of software activity details, wherein the determining comprises:
  inputting, to the trained ML system, the set of software activity details pertaining to the use of the computer system; and
  receiving, from the trained ML system, the set of expected hardware power consumption details based on the set of software activity details;

comparing the set of actual hardware power consumption details to the set of expected hardware power consumption details; and in response to the comparison identifying one or more variances that exceed one or more thresholds, performing one or more threat responses.

5. The information handling system of claim 4 wherein the set of actual hardware power consumption details further include at least one reading from the set of details consisting of a temperature reading, a voltage reading, and an electrical current reading, and wherein the set of software activity details include at least one detail from the set of details consisting of a plurality of process identifications corresponding to the one or more processes executing on the computer system, a CPU usage, a memory usage, and a number of ports used.

6. The information handling system of claim 4 wherein the first set of system data and the second set of system data includes, a set of operating system applied patches, a processor age, and a processor vendor.

7. A computer program product stored in a computer readable storage medium, comprising computer program code that, when executed by an information handling system, performs actions comprising:

training a machine learning (ML) system to determine expected hardware power consumption, wherein the training is based on a first power consumption, a first set of system data pertaining to a first operating system, and a first set of process data pertaining to one or more first processes;

receiving a set of actual hardware power consumption details pertaining to the use of a computer system;

receiving a set of software activity details pertaining to the use of the computer system, wherein the set of software activity details includes a second set of system data pertaining to the operating system of the computer system and a second set of process data pertaining to one or more processes executing on the computer system, wherein the first set of system data and the second set of system data includes an operating system version, an operating system level, and a processor type, and wherein the first set of process data and the second set of process data includes a processor usage, a number of threads, a memory usage, and a set of port usage information;

determining a set of expected hardware power consumption details based on the set of software activity details, wherein the determining further comprises:
  inputting, to the trained ML system, the set of software activity details pertaining to the use of the computer system; and
  receiving, from the trained ML system, the set of expected hardware power consumption details based on the set of software activity details;

comparing the set of actual hardware power consumption details to the set of expected hardware power consumption details; and in response to the comparison identifying one or more variances that exceed one or more thresholds, performing one or more threat responses.

8. The computer program product of claim 7 wherein the set of actual hardware power consumption details include at least one reading from the set of details consisting of a temperature reading, a voltage reading, and an electrical current reading, and wherein the set of software activity details further include at least one detail from the set of details consisting of a plurality of process identifications corresponding to the one or more processes executing on the computer system, a CPU usage, a memory usage, and a number of ports used.

9. The computer program product of claim 7 wherein the first set of system data and the second set of system data includes, a set of operating system applied patches, a processor age, and a processor vendor.

\* \* \* \* \*